United States Patent [19]
Henderson et al.

[11] Patent Number: 5,343,884
[45] Date of Patent: Sep. 6, 1994

[54] SELF-CLOSING GATE VALVE SYSTEM AND EXTERNAL SELF-CLOSING ACTUATOR MECHANISM THEREFOR

[76] Inventors: Tom Henderson, 303 E. Kern St.; Wayne Gibbs, 127 Kern St., both of Taft, Calif. 93268

[21] Appl. No.: 114,847

[22] Filed: Sep. 2, 1993

[51] Int. Cl.$^5$ .............................................. F16K 17/38
[52] U.S. Cl. .......................................... 137/77; 251/74
[58] Field of Search ...................... 137/77, 75; 251/74

[56] References Cited

U.S. PATENT DOCUMENTS

| | | | |
|---|---|---|---|
| 998,507 | 7/1911 | Hasty | 137/77 X |
| 1,026,262 | 5/1912 | Hasty | 137/77 |
| 3,165,236 | 1/1965 | Beazer et al. | 137/77 |
| 4,004,601 | 1/1977 | Bachelder et al. | 137/77 |
| 4,099,551 | 7/1978 | Billington et al. | 137/77 X |
| 5,004,003 | 4/1991 | Gray, Jr. | 251/74 X |
| 5,067,510 | 11/1991 | Breaux et al. | 137/77 |

OTHER PUBLICATIONS

Brochure of CFI Valve Specialties On Light Weight Gate Valves, publication date unknown.

*Primary Examiner*—Martin P. Schwadron
*Assistant Examiner*—Kevin L. Lee
*Attorney, Agent, or Firm*—Sixbey, Friedman, Leedom & Ferguson

[57] ABSTRACT

A self-closing actuator mechanism and a gate valve system equipped with the actuator mechanism, in which a coil spring acts on a gate valve actuating arm only in a closing direction, the coil spring being held in a compressed condition by retaining clips that are connected by a spring under tension and which carry a meltable link material on them between each clip and a holding sleeve. The clips release automatically, under the tensioning of their connecting spring, when either the holding sleeve is retracted or the link material melts. The gate valve system is designed to meet all regulations pertaining to the transportation of hazardous cargoes, while being low in cost and able to be retrofit installed on existing tank gate valves in a simple and easy manner.

17 Claims, 4 Drawing Sheets

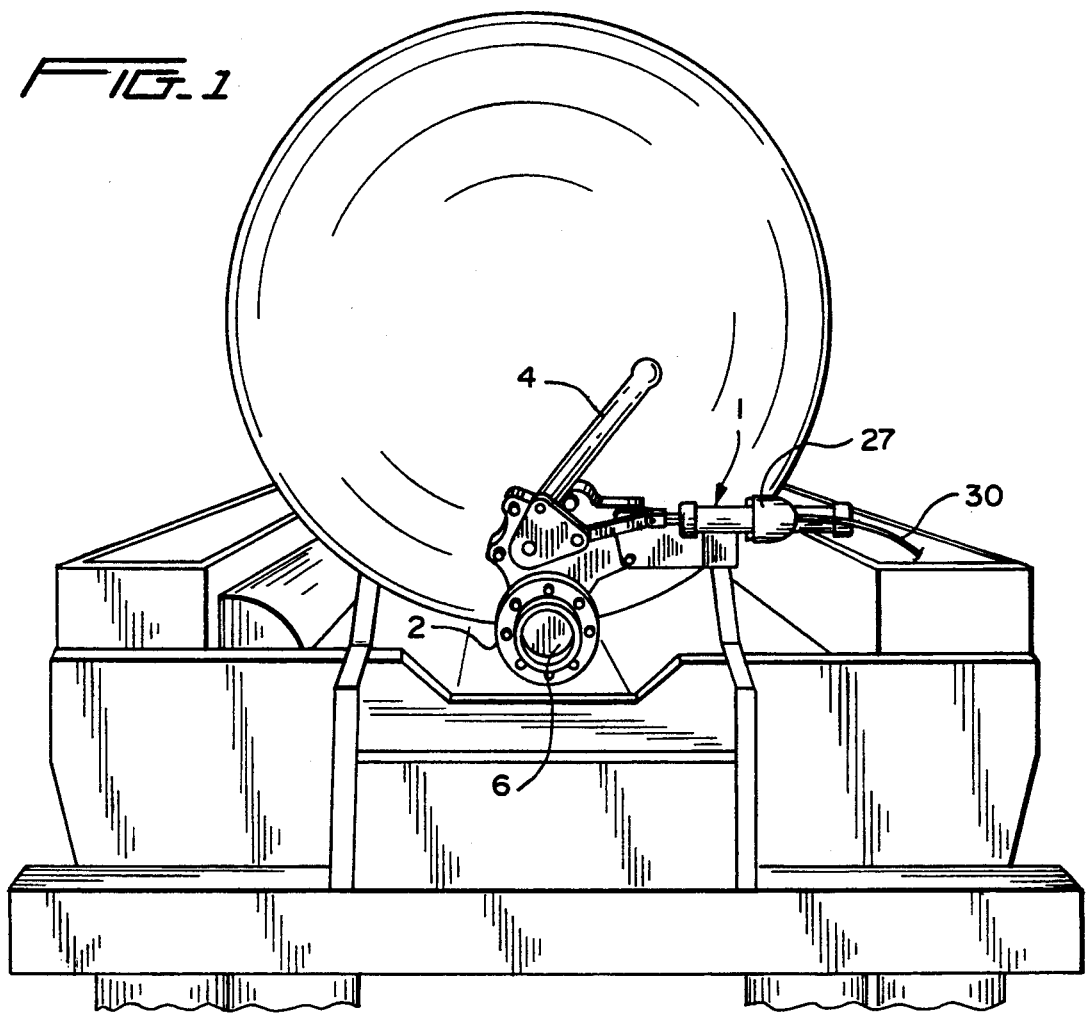
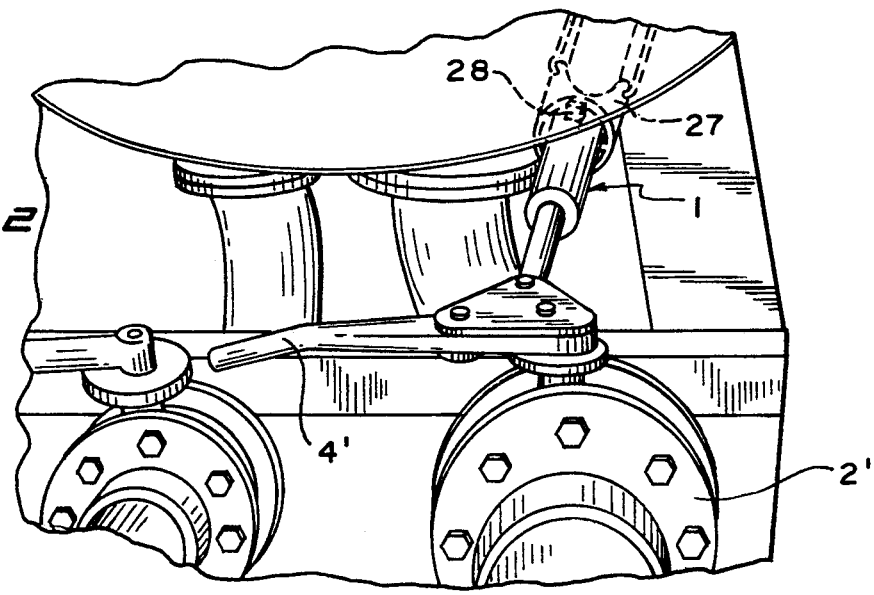

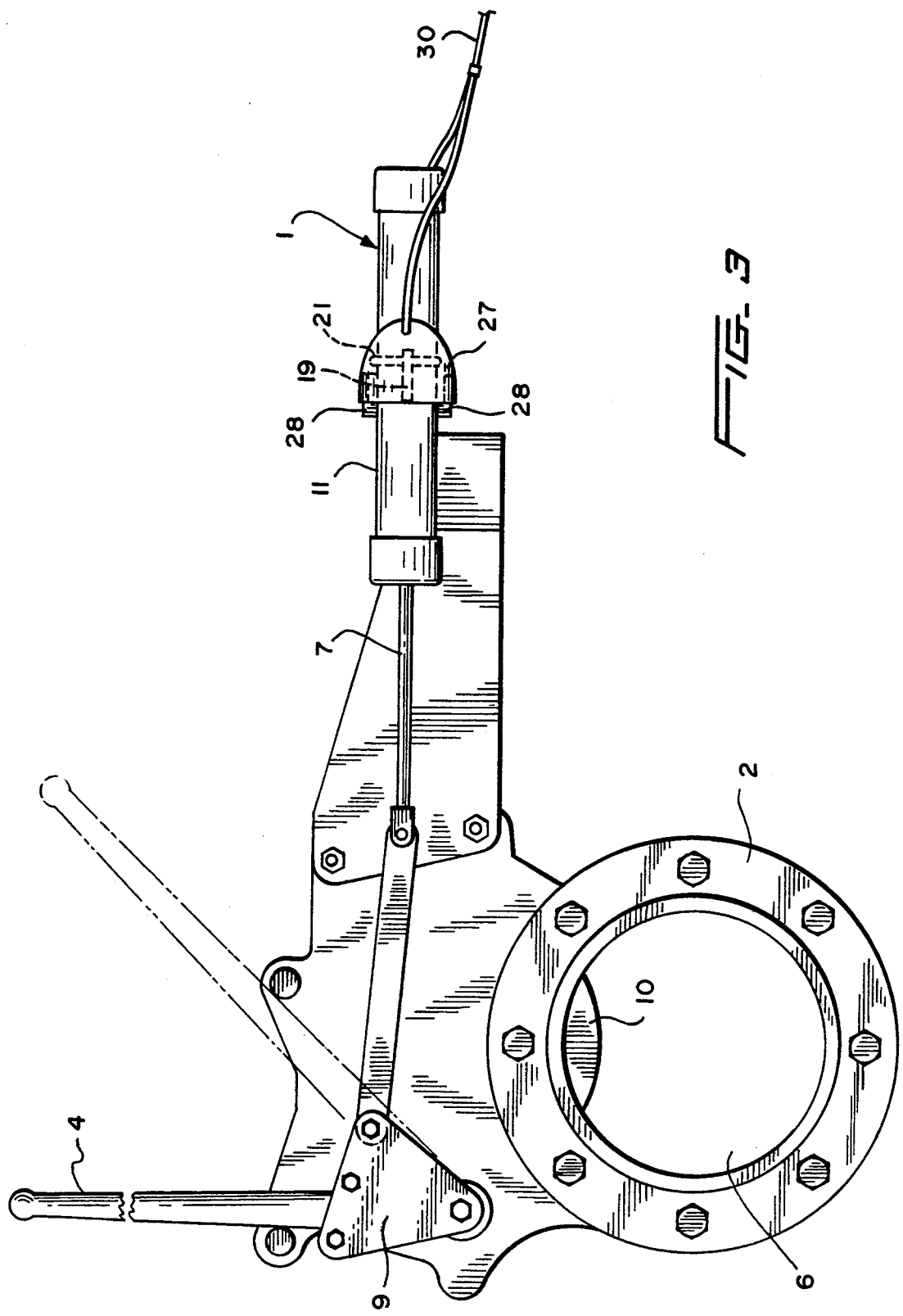

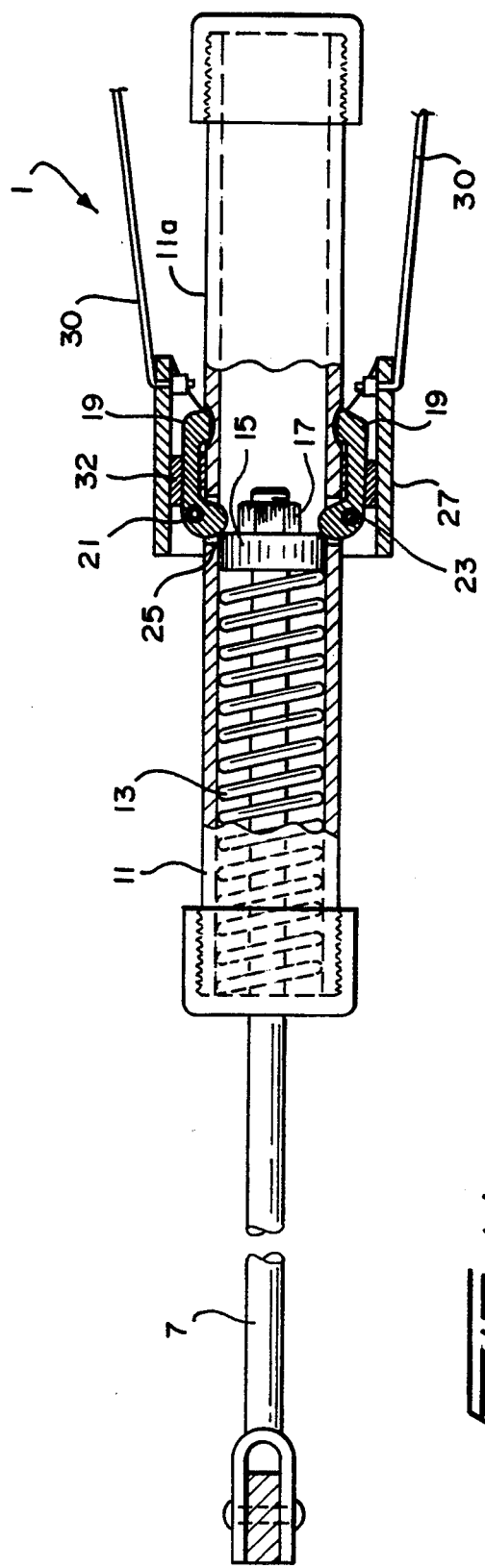
FIG. 4
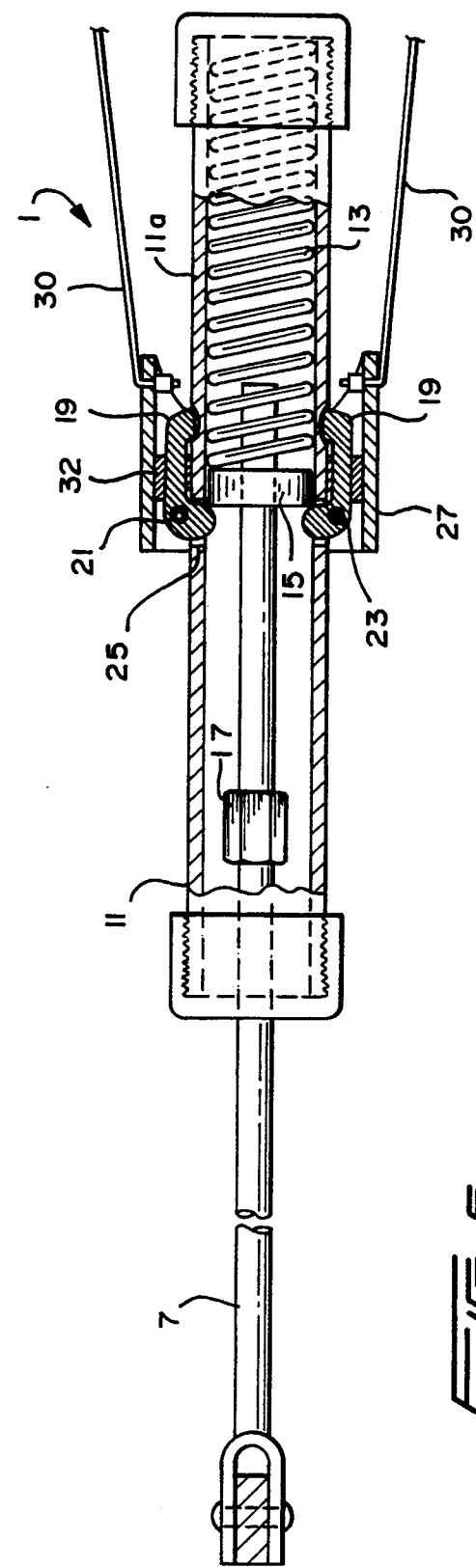
FIG. 5

SELF-CLOSING GATE VALVE SYSTEM AND EXTERNAL SELF-CLOSING ACTUATOR MECHANISM THEREFOR

BACKGROUND OF THE INVENTION

1. Field of the Invention

The present invention relates to gate valve systems of the type used on tank trucks, especially those used for carrying hazardous waste materials. More specifically, the present invention is directed to such gate valve systems as are equipped with an external self-closing mechanism that can be remote and temperature actuated as well as manually operated.

2. Description of Related Art

Tank trucks used for the transportation of liquid and semi-solid materials typically have at least one loading-/unloading outlet in the form of pipe-type member to which a hose may be detachably connected for directing the load being discharged into a receiving tank or the like. To start and stop the flow through the unloading outlet, the outlet is usually equipped with a gate valve. Such gate valves are well known and are manually actuated by an actuating lever being swung in an arc, thereby raising and lowering a closure disc within the valve body between a closed position seated against a valve seat and blocking the outlet opening, and and an open position shifted radially relative to the closed position. One commercial source for tank truck gate valves is CFI Valve Specialties of Berkeley, Calif.

Existing and proposed government regulations, for example, the U.S. Department of Transportation (DOT) rules for cargo tanks (see, §178.345-11 of Docket 183) dictate that tank outlets be fitted with an external self-closing system which is capable of closing the outlet within 30 seconds and which is remotely actuatable at a distance of at least 10 feet. Furthermore, such DOT regulations require that tanks being used to transport flammable, pyrophoric, oxidizing or Poison B liquids, such as fuels and hazardous waste materials, have a self-closing system that is, additionally, capable of being thermally activated to close at temperatures not to exceed 250° F. as a safeguard in the case of a fire.

Tank outlet gate valves with actuators that can meet the above-mentioned DOT regulations are available; for example, from the noted CFI Valve Specialties. However, such self-closing actuators are hydraulically operated and are not suitable for retrofit installation on gate valves that are currently only manually actuatable. Thus, such actuators are high in cost, and require replacing of the existing valve on tanks currently in service, in most instances.

Thus, there is a need for a self-closing actuator for gate valves which will meet all of the regulations pertaining to hazardous cargoes, yet will be low in cost and can be retrofit installed on existing tank gate valves in a simple and easy manner.

SUMMARY OF THE INVENTION

In view of the foregoing, it is a primary object of the present invention to provide a self-closing actuator for gate valves and a gate valve system equipped therewith which will meet all regulations pertaining to hazardous cargoes, yet will be low in cost and can be retrofit installed on existing tank gate valves in a simple and easy manner.

It is a more specific object to provide a gate valve actuator which can be configured for push or pull type actuation of a gate valve.

Another object of the present invention is to provide a gate valve actuator which is constructed of a minimum number of components which operates mechanically upon destruction of a thermal link.

These objects, and others, are obtained in accordance with preferred embodiments of the present invention in which a coil spring acts on a gate valve actuating arm only in a closing direction, the coil spring being held in a compressed condition by retaining clips that are connected by a spring under tension and which carry a meltable link material on them between each clip and a holding sleeve. The clips release automatically, under the tensioning of their connecting spring, when either the holding sleeve is retracted or the link material melts.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 1 is a rear perspective view of a tank truck having a gate valve and actuator assembly in accordance with the present invention;

FIG. 2 is a view similar to that of FIG. 1 for a valve having an a manual operating lever which moves in a horizontal plane.

FIG. 3 is a front view of the gate valve and actuator assembly shown in FIG. 1;

FIG. 4 is a partial cross-sectional view through a pull-type actuator assembly in accordance with a preferred embodiment of the present invention;

FIG. 5 is a partial cross-sectional view through a push-type actuator assembly in accordance with a preferred embodiment of the present invention;

DETAILED DESCRIPTION OF THE PREFERRED EMBODIMENTS

Figure 6:
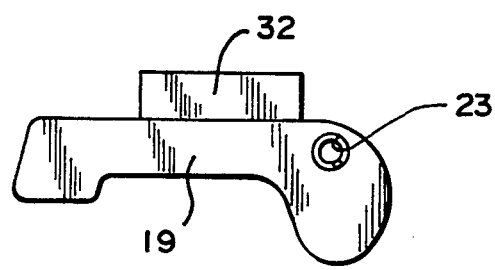
FIG. 6 is a side elevational view of a retaining clip of the actuator assemblies of FIGS. 4 & 5.

FIG. 1 shows a conventional tank truck which has been modified by the addition of a self-closing actuator unit 1 in accordance with the present invention to tank gate valve 2. Gate valve 2 has a manually operated hand lever 4 by which it can be opened and closed to control flow through outlet 6. Hand lever 4 swings in a vertical plane parallel to the plane of the outlet 6, and the actuator unit 1 is mounted to this lever. However, as can be seen from FIG. 2, where the actuator 1 is mounted to a horizontally pivoting lever 4' of a gate valve 2', the self-closing actuator 1 is usable on operating levers which have a vertical axis of rotation as it is on those which have a horizontal axis of rotation.

As can be more easily be seen with reference to FIG. 3, the actuator unit 1 has an operating rod 7 that is connected to hand lever 4 by a mounting bracket 9 and to which operating rod 7 is pivotally attached. When lever 4 is swung from its solid line position to its broken line position, closure disc 10 of the gate valve 2 is caused to move downward from its illustrated position to a position sealing outlet 6. While this closing movement can be produced by manual operation of lever 4 or by remote or automatic triggering of the actuator unit 1, in the manners described in detail below, opening of the gate valve 2 can only be produced by manually swinging of hand lever 4.

Operating rod 7 extends from bracket 9 into an operating cylinder 11. Within the operating cylinder 11, an operating spring 13 is disposed about operating rod 7 and engages a spring retainer 15 through which rod 7 passes with clearance. Operating rod 7 has an abutment stop 17, such as a threaded-on nut, for limiting the permissible axial movement of the operating rod 7 relative to the spring retainer 15 in a direction of movement counter to the action of operating spring 13 (this direction will depend on the side of the retainer 15 at which the spring is mounted, i.e., whether the spring 13 is to produce a pulling action on the operating rod 7 as in the FIG. 4 embodiment, or a pushing action on it as in the FIG. 5 embodiment).

In the normal, readiness, condition of the actuating unit 1, the operating spring 13 is held in a compressed condition (see FIGS. 4 & 5) by a pair of retaining clips 19. In this condition, the operating rod 7 is able to freely follow the movements of the hand lever 4 as it is swung between the open and closed positions of the gate valve 2 (compare FIGS. 4 & 5, which show the rod position when the gate valve 2 is open and closed, respectively). When gate valve 2 is open, abutment stop 17 is at or closely adjacent the spring retainer 15 (FIG. 4), and moves away from retainer 15 as it is closed (FIG. 5, and to the fight in FIG. 4).

Retaining clips 19 are carried on the outside of the cylinder by the action of a tension spring 21. Tension spring 21 has its ends connected together after having been passed through an aperture 23 of each of the retaining clips 19, and acts to pull retaining clips 19 radially outwardly relative to the position shown and out of blocking relationship with respect to spring retainer 15. For this reason, a retaining sleeve 27 is provided extending around barrel 11a. Retaining sleeve 27 has an inner diameter that is dimensioned to be small enough that it will force the retaining clips radially inwardly, against the force of tensioning spring 21, to a position where they will prevent the spring retainer 15 from being able to move passed them.

Figures 7, 8:
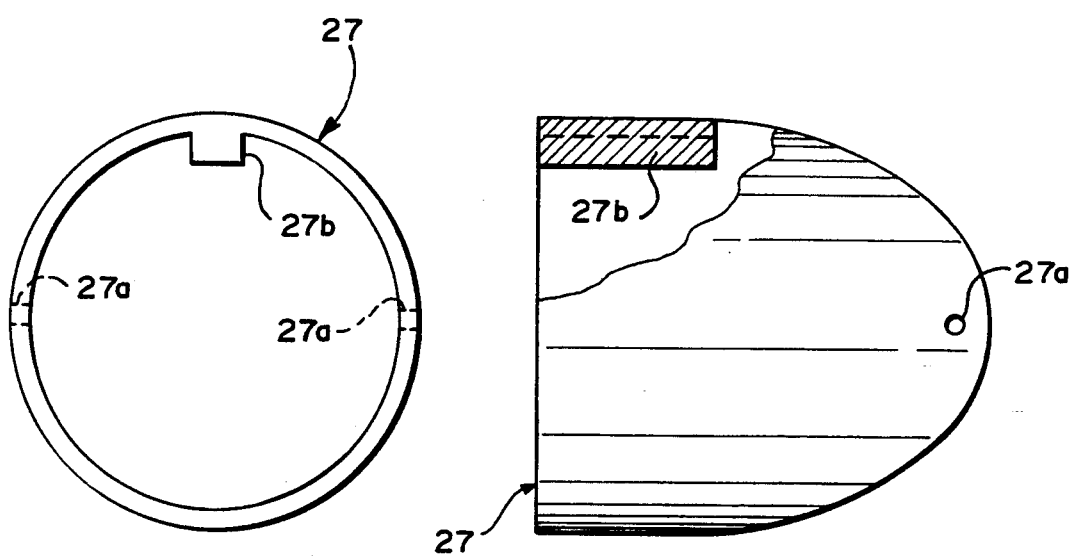
FIGS. 7 & 8 are front elevational and side partial cross-sectional views of the holding sleeve of the actuator assemblies of FIGS. 4 & 5.

Thus, to place the cylinder unit in its readiness condition, the cylinder unit 11 is "cocked" by pushing or pulling rod 7 (FIGS. 4 or 5, respectively) so as to compress the operating spring 13 to an extent that spring retainer 15 moves to between halfway and fully passed the clip-receiving slots 25 (this can be done merely by moving the hand lever 4 into the open position of the valve 2). Once that is done, retaining sleeve 27 is slid over the clips 19, (an action facilitated by an internal stabilizing rib 27b; see, FIGS. 7 and 8) pushing them through slots 25 into engagement with spring retainer 15, and producing a spring-loaded wedging action which serves to hold retaining sleeve 27 and clips 19 in place. To prevent the retaining sleeve from sliding passed and off of the clips 19, a pair of abutment stops 28 (FIG. 3) are welded onto the outside of the cylinder barrel 11a and against which the end of sleeve 27 will engage when it is properly in place holding down the clips 19.

With the cylinder unit in its readiness condition and the gate valve 2 open, the gate valve can be closed in any of three ways. First, it can be closed by operation of the hand lever 4, as already noted. Additionally, retaining sleeve 27 has a pair of attachment openings 27a to which a pull cable 30 is attached. By pulling on cable 30, via a hand lever or the like (not shown), retaining sleeve 27 can be pulled off of the retaining clips 19 (the retaining sleeve can be stabilized against swinging during this pulling action by internal rib 27b), so that they will "pop" out of their blocking position, thereby freeing the spring retainer 15. Once freed, operating spring 13 will push rod 7, via retainer 15 and abutment stop 17, inwardly (FIG. 4) or outwardly (FIG. 5) so as to pull-/push the hand lever 4 into its valve closing position.

The third closing action is a thermally-triggered one. More specifically, as can be seen in FIG. 6, a meltable link material 32 is fused onto each retaining clip 19 at a point which will engage the inner side of retaining sleeve 27 in the readiness condition of the cylinder unit described above. Link material 32 is a lead alloy (e.g., a bismuth, lead and tin alloy) or any other solid material which will rapidly melt at temperatures approaching 250° F. Furthermore, the link material 32 is of a thickness such that, once it melts, the clips 19 will be able to move a sufficient radial outward distance, despite the presence of retaining sleeve 27 thereabout, to unblock the spring retainer 15, thereby producing the same hand lever operating action as is produced when the sleeve 27 is pulled off, as described above.

While a single embodiment in accordance with the present invention have been shown and described, it should be understood that the invention is not limited thereto, and is susceptible to numerous changes and modifications as known to those skilled in the art. For example, instead of using a compression spring 13, operating rod 7 can be acted upon by a tension spring. Therefore, this invention is not limited to the details shown and described herein, and includes all such changes and modifications as are encompassed by the scope of the appended claims.

I claim:

1. A self-closing actuator mechanism for gate valve systems having a manually operable hand lever comprising:

(A) an operating rod having means for pivotally connecting it to a hand lever of a gate valve system, said rod being displacable in a first direction corresponding to a valve closing direction of movement of said hand lever and in an opposite, second direction corresponding to a valve opening direction of movement of said hand lever;

(B) spring means for applying a force to said operating rod in said first direction;

(C) securing means for releasably securing said spring means in a stressed readiness condition; and (D) thermally responsive releasing means for releasing said securing means in response to exposure to a temperature above a predetermined minimum value;

wherein said spring means is operable for moving said operating rod in said first direction into a position corresponding to a valve closed position of said hand lever when released by said securing means; and wherein said operating rod is freely displacable in said first and second directions when said spring means is secured in said readiness condition;

wherein said spring means comprises a spring and a spring retainer, said spring retainer being mounted with clearance about said operating rod and being engageable against an abutment stop thereon when said spring means is released; wherein said securing means comprises retaining clips, resilient means for applying a force acting to move said retaining clips to a position radially outward of said spring retainer, and releasable retaining means, acting on said thermally responsive means, for displacing said retaining clips against the force of said resilient means radially inwardly into a position blocking movement of said spring retainer for holding the spring means in its readiness condition.

2. A self-closing actuator mechanism according to claim 1, further comprising remotely actuatable releasing means for releasing said securing means independently of said thermally responsive releasing means.

3. A self-closing actuator mechanism according to claim 2, wherein said remotely actuatable releasing means is a pull cable.

4. A self-closing actuator mechanism according to claim 1, wherein said thermally responsive means comprises a meltable link material fused onto each of said retaining clips at a position engageable by said retaining means, said meltable material having a melting temperature below said predetermined minimum value and spacing said retaining clips from said retaining means by a distance at least as great as the radially inward displacement of the retaining clips produced by said retaining means, whereby said retaining clips are able to return to their radial outward position upon melting of said meltable material.

5. A self-closing actuator mechanism according to claim 4, wherein said predetermined minimum value below which said meltable material has a melting temperature is 250° F.

6. A self-closing actuator mechanism according to claim 4, wherein said spring means is mounted within a cylinder unit; wherein said retaining clips are disposed in clip-receiving slots in a cylinder wall of said cylinder unit; and wherein said retaining means is a sleeve mounted about said cylinder wall with clearance.

7. A self-closing actuator mechanism according to claim 6, further comprising remotely actuatable releasing means for releasing said securing means independently of said thermally responsive releasing means.

8. A self-closing actuator mechanism according to claim 7, wherein said remotely actuatable releasing means is a pull cable attached to said sleeve.

9. A gate valve system of the type having a closure disc that is mounted within a valve body with a valve seat and an outlet opening and is displacable by a hand lever between a closed position, in which the closure disc is seated against the valve seat blocking the outlet opening, and an open position, in which the closure disc is shifted radially relative to the closed position, and having an external self-closing actuator mechanism, wherein said self-closing actuator mechanism comprises:

(A) an operating rod pivotally connected to the hand lever, said rod being displacable in a first direction corresponding to a valve closing direction of movement of said hand lever and in an opposite, second direction corresponding to a valve opening direction of movement of said hand lever;

(B) spring means for applying a force to said operating rod in said first direction;

(C) securing means for releasably securing said spring means in a stressed readiness condition; and (D) thermally responsive releasing means for releasing said securing means in response to exposure to a temperature above a predetermined minimum value;

wherein said spring means is operable for moving said operating rod in said first direction into a position corresponding to a valve closed position of said hand lever when released by said securing means; and wherein said operating rod is freely displacable in said first and second directions when said spring means is secured in said readiness condition; wherein said spring means comprises a spring and a spring retainer, said spring retainer being mounted with clearance about said operating rod and being engageable against an abutment stop thereon when said spring means is released; wherein said securing means comprises retaining clips, resilient means for applying a force acting to move said retaining clips to a position radially outward of said spring retainer, and releasable retaining means, acting on said thermally responsive means, for displacing said retaining clips against the force of said resilient means radially inwardly into a position blocking movement of said spring retainer for holding the spring means in its readiness condition.

10. A gate valve system according to claim 9, wherein said self-closing actuator mechanism further comprises remotely actuatable releasing means for releasing said securing means independently of said thermally responsive releasing means.

11. A gate valve system according to claim 10, wherein said remotely actuatable releasing means is a pull cable.

12. A gate valve system according to claim 9, wherein said thermally responsive means comprises a meltable link material fused onto each of said retaining clips at a position engageable by said retaining means, said meltable material having a melting temperature below said predetermined minimum value and spacing said retaining clips from said retaining means by a distance at least as great as the radially inward displacement of the retaining clips produced by said retaining means, whereby said retaining clips are able to return to their radial outward position upon melting of said meltable material.

13. A gate valve system according to claim 12, wherein said predetermined minimum value below which said meltable material has a melting temperature is 250° F.

14. A gate valve system according to claim 12, wherein said spring means is mounted within a cylinder unit; wherein said retaining clips are disposed in clip-receiving slots in a cylinder wall of said cylinder unit; and wherein said retaining means is a sleeve mounted about said cylinder wall with clearance.

15. A gate valve system according to claim 14, further comprising remotely actuatable releasing means for releasing said securing means independently of said thermally responsive releasing means.

16. A gate valve system according to claim 15, wherein said remotely actuatable releasing means is a pull cable.

17. A gate valve system according to claim 9, wherein said gate valve system forms an unloading outlet of a tank truck of the type used for the transportation of liquid and semi-solid materials.

* * * * *